United States Patent [19]

Harigaya et al.

[11] Patent Number: 5,095,479
[45] Date of Patent: Mar. 10, 1992

[54] OPTICAL INFORMATION RECORDING MEDIUM

[75] Inventors: Makoto Harigaya, Hiratsuka; Yukio Ide, Mishima; Yoshiyuki Kageyama, Yokohama; Hiroko Iwasaki, Tokyo, all of Japan

[73] Assignee: Ricoh Company, Ltd., Tokyo, Japan

[21] Appl. No.: 744,469

[22] Filed: Aug. 12, 1991

[30] Foreign Application Priority Data

Aug. 13, 1990 [JP] Japan ................................. 2-211593

[51] Int. Cl.⁵ ............................................... G11B 7/24
[52] U.S. Cl. .................................... 369/288; 369/284; 369/286; 369/275.2; 346/135.1; 430/945; 430/495
[58] Field of Search ...................... 369/275.2, 284, 286, 369/288; 346/135.1, 76 L; 430/945, 495

[56] References Cited

U.S. PATENT DOCUMENTS 3,530,441  9/1970  Ovshinsky .

FOREIGN PATENT DOCUMENTS 61-219692  9/1986  Japan .
61-270190  11/1986 Japan .
62-19490   1/1987  Japan .
62-73438   4/1987  Japan .
1-104766   4/1989  Japan .
2-64929    3/1990  Japan .
2-64930    3/1990  Japan .

Primary Examiner—Stuart S. Levy
Assistant Examiner—Hoa Nguyen
Attorney, Agent, or Firm—Cooper & Dunham

[57] ABSTRACT

An optical information recording medium is composed of a substrate and a recording layer, formed thereon, which recording layer causes the reversible phase change by the application of an electromagnetic wave thereto, and comprises a phase-changeable type alloy with the composition of $(XYZ_2)_{1-x}M_x$, wherein X is an element of the group Ib, Y is an element of the group Va, Z is an element of the group VIa, M is an element selected from the group consisting of Sb, Bi, In, Al and Ga, and $0 < x < 1$.

10 Claims, No Drawings

OPTICAL INFORMATION RECORDING MEDIUM

BACKGROUND OF THE INVENTION

1. Field of the Invention

This invention relates to an optical information recording medium for use with the apparatus in the field of optical memory, and more particularly to a phase-changeable type optical information recording medium comprising a phase-changeable recording layer, capable of recording, reproducing, erasing and overwriting information by reversibly changing the phase of the recording layer with application of optical beams to the recording medium.

2. Discussion of Background

The so-called phase-changeable type recording media are conventionally known, in which information is recorded therein, reproduced therefrom and erased therefrom with application of electromagnetic waves, for example, a laser beam to the recording medium to change the phase of a recording layer of the recording medium, for example, from a crystalline state to an amorphous state or from one crystalline state to another crystalline state.

Intensive research and development activities concerning the above-mentioned phase-changeable type optical information recording media have been recently conducted because it is possible to overwrite information in the recording medium by the application of a single beam thereto, which is considered to be difficult with the magneto-optical memory technology, and an optical system for a drive unit for the optical information recording medium is comparatively simple in the mechanism.

As representative examples of such a phase-changeable type optical recording medium, there are disclosed in U.S. Pat. No. 3,530,441 recording media which comprise a recording layer comprising a chalcogen-type alloy such as Ge-Te, Ge-Te-Sb, Ge-Te-S, Ge-Se-S, Ge-Se-Sb, Ge-As-Se, In-Te, Se-Te or Se-As.

In addition, for the purpose of improving the stability and high-speed crystallization, an alloy in which Au is added to a Ge-Te based alloy is disclosed in Japanese Laid-Open Patent Application 61-219692, an alloy in which Sn and Au are added to the Ge-Te based alloy is disclosed in Japanese Laid-Open Patent Application 61-270190; and Pd is added thereto as disclosed in Japanese Laid-Open Patent Application 62-19490. Furthermore, to improve the repetition performance of the recording and erasing operation, a specific composition ratio of the Ge-Te-Se-Sb alloy is proposed for use in the recording layer of the recording medium as in Japanese Laid-Open Patent Application 62-73438.

SUMMARY OF THE INVENTION

Accordingly, an object of the present invention is to provide a phase-changeable type optical information recording medium free from the conventional shortcomings, capable of overwriting information, with the recording sensitivity improved, high-speed erasing operation achieved, the erasability increased, and the stability of the recorded information ensured.

The above-mentioned object of the present invention can be achieved by an optical information recording medium comprising a substrate and a recording layer formed on said substrate, whose phase is reversibly changeable under application of electromagnetic waves thereto, the recording layer comprising a phase-changeable type alloy with the composition of $(XYZ_2)_{1-x}M_x$, wherein X is one element selected from the elements of group Ib of the periodic table, Y is one element selected from the elements of group Va of the periodic table, Z is one element selected from the elements of group VIa of the periodic table, M is one element selected from the group consisting of Sb, Bi, In, Al and Ga, and $0 < X < 1$.

The recording layer of the optical information recording medium according to the present invention comprises the above-mentioned phase-changeable type alloy.

The phase-changeable type alloy has the composition of $(XYZ_x)_{1-x}M_x$, wherein X is one element selected from the elements of group Ib of the periodic table, Y is one element selected from the elements of group Va of the periodic table, Z is one element selected from the elements of group VIa of the periodic table, M is one element selected from the group consisting of Sb, Bi, In, Al and Ga, and $0 < X < 1$.

There are two representative examples of the phase-changeable type alloy for use in the present invention. One is an alloy with the composition of $(XYZ_2)_{1-x}M_x$, in which X is one element selected from the elements of group Ib of the periodic table, Y is one element selected from the elements of group Va of the periodic table, Z is one element selected from the elements of group VIa of the periodic table, M is one element of Sb or Bi, and $0.35 \leq X \leq 0.95$, preferably $0.5 \leq X \leq 0.9$, which is referred to the phase-changeable type Alloy Type A; and the other is an alloy with the composition of $(XYZ_x)_{1-x}M_x$, in which X is one element selected from the elements of group Ib of the periodic table, Y is one element selected from the elements of group Va of the periodic table, Z is one element selected from the elements of group VIa of the periodic table, M is one element of In, Al or Ga and $0.1 \leq X \leq 0.8$, preferably $0.15 \leq X \leq 0.65$, which is referred to the phase-changeable type Alloy Type B.

More specifically, X contained in the alloy with the composition of $(XYZ_2)_{1-x}M_x$ is, for example, Cu or Ag, Y is, for example, Sb or Bi, and Z is, for example, Se or Te.

In the present invention, the aforementioned phase-changeable type alloy for use in the recording layer can produce the following advantages:

(1) Because of the elements of the composition and the composition ratio thereof, the crystal system of the above phase-changeable type alloy can become close to the NaCl-type cubic system, tetragonal system, rhombic system and hexagonal system, which are relatively high in symmetry. As a result, high-speed crystallization can be attained.

(2) The melting point of the above phase-changeable type alloy is in the range of 520° to 700° C. in the case where M in the composition of the alloy is Sb or Bi; and in the case where M represents In, Al or Ga, the melting point thereof is in the range of 500° to 600° C., so that the recording sensitivity can therefore be improved.

(3) The band gap of the above phase-changeable type alloy is such that it can absorb a (GaAl)As-type semiconductor laser beam so efficiently that the recording sensitivity and erasing sensitivity can be improved.

The phase-changeable type Alloy Type A will now be explained in detail.

When a compound of $XYZ_2$, for instance, $AgSbTe_2$, and Sb as the element M, are used to form an alloy and the alloy is used in the recording layer, the recording sensitivity is improved because the melting point of the obtained alloy is decreased to the eutectic point thereof. In addition, high speed erasing performance, that is, improved erasability, can be attained because the element M, Sb in this case, works as a nucleus for crystallization and promotes the crystallization. Furthermore, by the addition of the element M, Sb in this case, to the compound $XYZ_2$, the crystallization nuclei are formed throughout the alloy and the crystal growth speed is increased, so that the erasability is improved.

The above-mentioned characteristics of the recording medium can be most effectively obtained when x in the composition $(XYZ_2)_{1-x}M_x$ of the phase-changeable type Alloy Type A is 0.35 or more and 0.95 or less, and more preferably 0.5 or more and 0.9 or less.

Specific examples of the aforementioned phase-changeable type Alloy Type A for use in the optical information recording medium of the present invention are as follows.

$(AgSbTe_2)_{1-x}Sb_x$, $(AgSbSe_2)_{1-x}Sb_x$,
$(CuSbTe_2)_{1-x}Sb_x$, $(CuSbSe_2)_{1-x}Sb_x$,
$(AgBiTe_2)_{1-x}Sb_x$, $(AgBiSe_2)_{1-x}Sb_x$,
$(CuBiTe_2)_{1-x}Sb_x$, $(CuBiSe_2)_{1-x}Sb_x$,
$(AgSbTe_2)_{1-x}Bi_x$, $(AgSbSe_2)_{1-x}Bi_x$,
$(CuSbTe_2)_{1-x}Bi_x$, $(AgBiTe_2)_{1-x}Bi_x$, and
$(CuBiTe_1)_{1-x}Bi_x$.

The phase-changeable type Alloy Type B will now be explained in detail.

When a compound of $XYZ_2$, for instance, $AgSbTe_2$, and In as the element M, which belongs to group IIIa of the periodic table, are used to form an alloy and the alloy is used in the recording layer, the recording sensitivity is improved because the melting point of the obtained alloy is decreased to the eutectic point thereof. In addition, high speed erasing performance, that is, improved erasability, can be attained because the element M, In in this case, works as a nucleus for crystallization and promotes the crystallization. Furthermore, by the addition of the element M, In in this case, to the compound $XYZ_2$, the crystallization nuclei are formed throughout the alloy and the crystal growth speed is increased, so that the erasability is improved.

The above-mentioned characteristics of the recording medium can be most effectively obtained when x in the composition $(XYZ_2)_{1-x}M_x$ of the phase-changeable type Alloy Type B is 0.1 or more and 0.8 or less, and more preferably 0.15 or more and 0.65 or less.

Specific examples of the aforementioned phase-changeable type Alloy for use in the optical information recording medium of the present invention are as follows.

$(AgSbTe_2)_{1-x}In_x$, $(AgSbSe_2)_{1-x}In_x$,
$(AgSbTe_2)_{1-x}Ga_x$, $(AgSbSe_2)_{1-x}Ga_x$,
$(AgSbTe_2)_{1-x}Al_x$, $(AgSbSe_2)_{1-x}Al_x$,
$(AgBiTe_2)_{1-x}In_x$, $(AgBiSe_2)_{1-x}In_x$,
$(AgBiTe_2)_{1-x}Ga_x$, $(AgBiSe_2)_{1-x}Ga_x$,
$(AgBiTe_2)_{1-x}Al_x$, $(AgBiSe_2)_{1-x}Al_x$,
$(CuSbTe_2)_{1-x}In_x$, $(CuSbTe_2)_{1-x}Ga_x$,
$(CuSbTe_2)_{1-x}Al_x$, $(CuBiTe_2)_{1-x}In_x$,
$(CuBiTe_2)_{1-x}Ga_x$, and $(CuBiTe_2)_{1-x}Al_x$.

As the material for the substrate for use in the optical information recording medium of the present invention, glass, quartz, ceramic and resin are employed. In particular, the resin substrate is preferred from the viewpoints of the moldability and the manufacturing cost. Examples of the resin for use in the substrate are polycarbonate resin, acrylic resin, epoxy resin, polystyrene resin, acrylonitrile-styrene copolymer resin, polyethylene resin, polypropylene resin, silicone resin, fluoroplastics, ABS resin and urethane resin. Of these resins, polycarbonate resin and acrylic resin such as polymethyl methacrylate are advantageous in the processability and the optical characteristics.

The substrate for use in the recording medium of the present invention may be prepared in the form of a disk, a card or a sheet.

In the optical information recording medium according to the present invention, additional layers such as a protective layer may be provided between the substrate and the recording layer and/or o the recording layer when necessary.

When the protective layer is interposed between the substrate and the recording layer and/or superposed on the recording layer, the materials with thermal stability, for example, nitrides such as silicon nitride, oxides such as silicon dioxide and titanium dioxide and carbides ca be employed for the protective layer. More specifically, metallic oxides such as SiO, $SiO_2$, ZnO, $SnO_2$, $Al_2O_3$, $TiO_2$, $In_2O_3$, MgO and $ZrO_2$; nitrides such as $Si_3N_4$, AlN, TiN, BN and ZrN; carbides such as SiC, TaC, $B_4C$, WC, TiC and ZrC; carbon with a diamond-structure; and mixtures thereof can be used as the material for the protective layer. The thus prepared protective layer may contain impurities therein when necessary.

The protective layer can be prepared by the conventional film-forming methods such as vacuum-deposition, sputtering, plasma CVD, optical CVD, ion plating and electron beam deposition.

It is preferable that the thickness of the protective layer be in the range of 300 to 3000 Å, and more preferably in the range of 500 to 2000 Å.

The recording layer for use in the present invention can generally be prepared by the magnetron RF sputtering.

It is preferable that the thickness of the recording layer be in the range of 100 to 2000 Å, and more preferably in the range of 200 to 1500 Å.

To record, reproduce and erase information in the optical information recording medium of the present invention, the electromagnetic wave is employed, as previously mentioned. Examples of the electromagnetic wave include laser beams, electron rays, x-rays, ultraviolet rays, visible light, infrared rays, microwave and the like. In particular, the semiconductor laser beam is preferable because the drive unit to be employed can be compact.

Other features of this invention will become apparent in the course of the following description of exemplary embodiments, which are given for illustration of the invention and are not intended to be limiting thereof.

EXAMPLE I-1

On a polycarbonate substrate with a thickness of 1.2 mm and a diameter of 88 mm, a spiral guide groove with a pitch of 1.6 μm and a depth of 700 Å was formed, whereby a substrate was prepared.

$Si_3N_4$ was coated on the above-prepared substrate by the magnetron RF sputtering, so that a first heat-resistant protective layer with a thickness of 2000 Å was formed on the substrate.

A phase-changeable type alloy $(AgSbTe_2)_{0.2}Sb_{0.8}$ was coated on the first heat-resistant protective layer by the magnetron RF sputtering, so that a recording layer with a thickness of 1000 Å was formed on the first heat-resistant protective layer.

Si$_3$N$_4$ was coated on the above-prepared recording layer by the magnetron RF sputtering, so that a second heat-resistant protective layer with a thickness of 1000 Å was formed on the recording layer. Thus, an optical information recording medium according to the present invention was obtained.

To evaluate the physical properties of the recording layer, the recording layer was formed on the polycarbonate substrate, with a sheet of slide glass interposed therebetween in the center of the substrate. The physical properties of the recording layer, such as the crystallization point, the activation energy and the spectral reflectance of the recording layer, and the recording characteristics of the obtained optical information recording medium were evaluated as follows.

The recording layer was subjected to the differential thermal analysis. As a result, the exothermic point, which was regarded as a crystallization point was observed at 187° C.

The activation energy of the recording layer was 2.72 eV according to the Kissinger plot.

The spectral reflectance of the recording layer immediately after the film-forming ($R_{asdepo}$) and the spectral reflectance of the same after the heat treatment at 250° C. ($R_{250° C.}$) were measured by the application of the laser beam with a wavelength of 830 nm to the recording medium. The spectral reflectance ($R_{asdepo}$) was 52.0% and the spectral reflectance ($R_{250° C.}$) was 62.0%.

The recording characteristics of the obtained optical information recording medium were evaluated by the following method.

To initialize the recording layer of the recording medium, the continuous wave (CW) laser beam with a laser power of 5 to 8 mW and a wavelength of 830 nm was applied to the recording medium to cause the recording layer to crystallize. Thereafter, to perform the recording operation, reproducing operation and erasing operation, the semiconductor laser beam with a wavelength of 830 nm, the beam diameter of which was narrowed to approximately 1 μm, was applied to the recording medium, with the recording medium being caused to rotate at a linear speed of 6.9 m/sec under the conditions of a recording and reproduction frequency of 3.8 MHz, a recording laser power of 9 mW, a reproducing laser power of 1 mW and an erasing laser power of 5 mW.

As a result, the C/N (Carrier/Noise) ratio of 48 dB was obtained when the recording operation was performed at a laser power of 9 mW.

To erase the above recorded information, the CW laser beam with a laser power of 5 mW was applied to the recorded portion. The residual C/N ratio was 17 dB, so that the erasability was −31 dB.

Next, the overwriting characteristics of the recording medium were evaluated by the following method.

The recording operation was first performed at a frequency of 3.8 MHz. After the recording operation, the initial C/N ratio was 48 dB. Then, the overwriting operation was performed at a frequency of 2 MHz by recording new information at a laser power of 10 mW while erasing the recorded information at a laser power of 5 mW. After the overwriting operation, the C/N ratio of the newly recorded portion was 47 dB, which was almost the same as the above. In addition, the initial C/N ratio was decreased to 20 dB, so that the erasability was −28 dB.

Furthermore, after a cycle of the recording operation, the reproducing operation and the erasing operation was repeated 10$^5$ times, the respective characteristics scarcely deteriorated.

EXAMPLE I-2

The procedure for preparation of the optical information recording medium used in Example I-1 was repeated except that the phase-changeable type alloy with the composition of (AgSbTe$_2$)$_{0.2}$Sb$_{0.8}$ for use in the recording layer in Example I-1 was replaced by a phase-changeable type alloy with the composition of (AgSbTe$_2$)$_{0.2}$Bi$_{0.8}$, so that an optical information recording medium according to the present invention was obtained.

The recording layer of the thus obtained optical information recording medium was still in the crystalline phase immediately after the film-forming. As a matter of course, it is possible to obtain the recording layer in the amorphous phase at the initial stage by changing the film-forming conditions. Therefore, the evaluation of the crystallization point and the spectral reflectance of the recording layer in the crystalline phase and the amorphous phase was not conducted.

The recording characteristics of the obtained optical information recording medium were evaluated by the following method.

To initialize the recording layer of the recording medium, the recording layer was subjected to aging by application of the semiconductor laser beam with a laser beam of 3 mW and a wavelength of 830 nm to the recording medium. Thereafter, to perform the recording operation, reproducing operation and erasing operation, the semiconductor laser beam with a wavelength of 830 nm, the beam diameter of which was narrowed to approximately 1 μm, was applied to the recording medium, with the recording medium being caused to rotate at a linear speed of 6.9 m/sec under the conditions of a recording and reproduction frequency of 3.8 MHz, a recording laser power of 11 mW, a reproducing laser power of 1 mW and an erasing laser power of 6 mW.

As a result, the C/N ratio of 47 dB was obtained when the recording operation was performed at a laser power of 11 mW.

To erase the above recorded information, the CW laser beam with a laser power of 6 mW was applied to the recorded portion. The residual C/N ratio was 18 dB, so that the erasability was −29 dB.

Next, the overwriting characteristics of the recording medium were evaluated by the following method.

The recording operation was first performed at a frequency of 3.8 MHz. After the recording operation, the initial C/N ratio was 47 dB. Then, the overwriting operation was performed at a frequency of 2 MHz by recording new information at a laser power of 11 mW while erasing the recorded information at a laser power of 6 mW. After the overwriting operation, the C/N ratio of the newly recorded portion was 46 dB, which was almost the same as the above. In addition, the initial C/N ratio was decreased to 19 dB, so that the erasability was −28 dB.

Furthermore, after a cycle of the recording operation, the reproducing operation and the erasing operation was repeated 10$^5$ times, the respective characteristics scarcely deteriorated.

EXAMPLE II-1

On a polycarbonate substrate with a thickness of 1.2 mm and a diameter of 88 mm, a spiral guide groove with a pitch of 1.8 μm and a depth of 700 Å was formed, whereby a substrate was prepared.

$Si_3N_4$ was coated on the above-prepared substrate by the magnetron RF sputtering, so that a first heat-resistant protective layer with a thickness of 2000 Å was formed on the substrate.

A phase-changeable type alloy $(AgSbTe_2)_{0.7}In_{0.3}$ was coated on the first heat-resistant protective layer by the magnetron RF sputtering, so that a recording layer with a thickness of 1000 Å was formed on the first heat-resistant protective layer.

$Si_3N_4$ was coated on the above-prepared recording layer by the magnetron RF sputtering, so that a second heat-resistant protective layer with a thickness of 1000 Å was formed on the recording layer. Thus, an optical information recording medium according to the present invention was obtained.

The recording characteristics of the thus obtained optical information recording medium were evaluated by the following method.

To initialize the recording layer of the recording medium, the CW laser beam with a laser power of 5 to 8 mW and a wavelength of 830 nm was applied to the recording medium to cause the recording layer to crystallize. Thereafter, to perform the recording operation, reproducing operation and erasing operation, the semiconductor laser beam with a wavelength of 830 nm, the beam diameter of which was narrowed to approximately 1 μm, was applied to the recording medium, with the recording medium being caused to rotate at a linear speed of 6.9 m/sec under the conditions of a recording and reproduction frequency of 3.8 MHz, a recording laser power of 11 mW, a reproducing laser power of 1 mW and an erasing laser power of 5 mW.

As a result, the C/N (Carrier/Noise) ratio of 50 dB was obtained when the recording operation was performed at a laser beam of 11 mW.

To erase the above recorded information, the CW laser beam with a laser power of 5 mW was applied to the recorded portion. The residual C/N ratio was 20 dB, so that the erasability was −30 dB.

Next, the overwriting characteristics of the recording medium were evaluated by the following method.

The recording operation was first performed at a frequency of 3.8 MHz. After the recording operation, the initial C/N ratio was 50 dB. Then, the overwriting operation was performed at a frequency of 2 MHz by recording new information at a laser power of 10 mW while erasing the recorded information at a laser power of 5 mW. After the overwriting operation, the C/N ratio of the newly recorded portion was 49 dB, which was almost the same as the above. In addition, the initial C/N ratio was decreased to 21 dB, so that the erasability was −29 dB.

Furthermore, after a cycle of the recording operation, the reproducing operation and the erasing operation was repeated $10^5$ times, the respective characteristics scarcely deteriorated.

EXAMPLE II-2

The procedure for preparation of the optical information recording medium used in Example II-1 was repeated except that the phase-changeable type alloy with the composition of $(AgSbTe_2)_{0.7}In_{0.3}$ for use in the recording layer in Example II-1 was replaced by a phase-changeable type alloy with the composition of $(AgBiTe_2)_{0.6}In_{0.4}$, so that an optical information recording medium according to the present invention was obtained.

The recording characteristics of the thus obtained optical information recording medium were evaluated by the same method as in Example II-1.

To initialize the recording layer of the recording medium, the CW laser beam with a laser power of 5 mW and a wavelength of 830 nm was applied to the recording medium to cause the recording layer to crystallize. Thereafter, to perform the recording operation, reproducing operation and erasing operation, the semiconductor laser beam with a wavelength of 830 nm, the beam diameter of which was narrowed to approximately 1 μm, was applied to the recording medium, with the recording medium being caused to rotate at a linear speed of 6.9 m/sec under the conditions of a recording and reproduction frequency of 3.8 MHz, a recording laser power of 10 mW, a reproducing laser power of 1 mW and an erasing laser power of 6 mW.

As a result, the C/N (Carrier/Noise) ratio of 49 dB was obtained when the recording operation was performed at a laser power of 10 mW.

To erase the above recorded information, the CW laser beam with a laser power of 6 mW was applied to the recorded portion. The residual C/N ratio was 19 dB, so that the erasability was −30 dB.

Next, the overwriting characteristics of the recording medium were evaluated by the following method.

The recording operation was first performed at a frequency of 3.8 MHz. After the recording operation, the initial C/N ratio was 49 dB. Then, the overwriting operation was performed at a frequency of 2 MHz by recording new information at a laser power of 10 mW while erasing the recorded information at a laser power of 6 mW. After the overwriting operation, the C/N ratio of the newly recorded portion was 47 dB, which was almost the same as the above. In addition, the initial C/N ratio was decreased to 21 dB, so that the erasability was −28 dB.

Furthermore, after a cycle of the recording operation, the reproducing operation and the erasing operation was repeated $10^5$ times, the C/N ratio was scarcely decreased.

To erase the recorded information, the CW beam with an erasing power of 6 mW was applied to the recording layer. As a result, the erasability was −30 dB.

Then, to evaluate the overwriting characteristics of the recording medium, the semiconductor laser beam was applied to the recording layer at a recording power of 10 mW and an erasing power of 6 mW with the frequency changed between 3.8 MHz and 2.0 MHz. As a result, the initial recording C/N ratio was 49 dB, and the C/N ratio after the overwriting operation was as high as 49 dB. The erasing C/N ratio was −28 dB.

Furthermore, after the recording operation, the reproducing operation and the erasing operation were repeated $10^5$ times, the respective characteristics scarcely deteriorated.

As previously mentioned, the recording sensitivity, the erasability and the repetition performance of the recording medium can be improved when the recording layer of the optical information recording medium comprises the phase-changeable type alloy for use in the present invention.

What is claimed is:

1. An optical information recording medium comprising a substrate and a recording layer formed on said substrate whose phase is reversibly changeable under application of electromagnetic waves thereto, said recording layer comprising a phase-changeable type alloy with the composition of $(XYZ_2)_{1-x}M_x$, wherein X is one element selected from the elements of group Ib of the periodic table, Y is one element selected from the elements of group Va of the periodic table, Z is one element selected from the elements of group VIa of the periodic table, M is one element selected from the group consisting of Sb, Bi, In, Al and Ga, and $0 < x < 1$.

2. The optical information recording medium as claimed in claim 1, wherein said recording layer comprises a phase-changeable type alloy with the composition of $(XYZ_2)_{1-x}M_x$, wherein M is an element of Sb or Bi, and $0.35 \leq x \leq 0.95$.

3. The optical information recording medium as claimed in claim 2, wherein said composition of $(XYZ_2)_{1-x}M_x$, $0.5 \leq x \leq 0.9$.

4. The optical information recording medium as claimed in claim 2, wherein said phase-changeable type alloy with the composition of $(XYZ_2)_{1-x}M_x$ is selected from the group consisting of $(AgSbTe_2)_{1-x}Sb_x$, $(AgSbSe_2)_{1-x}Sb_x$, $(CuSbTe_2)_{1-x}Sb_x$, $(CuSbSe_2)_{1-x}Sb_x$, $(AgBiTe_2)_{1-x}Sb_x$, $(AgBiSe_2)_{1-x}Sb_x$, $(CuBiTe_2)_{1-x}Sb_x$, $(CuBiSe_2)_{1-x}Sb_x$, $(AgSbTe_2)_{1-x}Bi_x$, $(AgSbSe_2)_{1-x}Bi_x$, $(CuSbTe_2)_{1-x}Bi_x$, $(AgBiTe_2)_{1-x}Bi_x$ and $(CuBiTe_2)_{1-x}Bi_x$.

5. The optical information recording medium as claimed in claim 1, wherein said recording layer comprises a phase-changeable type alloy with the composition of $(XYZ_2)_{1-x}M_x$, wherein M is an element of In, Al or Ga, and $0.1 \leq x \leq 0.8$.

6. The optical information recording medium as claimed in claim 5, wherein said composition of $(XYZ_2)_{1-x}M_x$, $0.15 \leq x \leq 0.65$.

7. The optical information recording medium as claimed in claim 5, wherein said phase-changeable type allow with the composition of $(XYZ_2)_{1-x}M_x$ is selected from the group consisting of $(AgSbTe_2)_{1-x}In_x$, $(AgSbSe_2)_{1-x}In_x$, $(AgSbTe_2)_{1-x}Ga_x$, $(AgSbSe_2)_{1-x}Ga_x$, $(AgSbTe_2)_{1-x}Al_x$, $(AgSbSe_2)_{1-x}Al_x$, $(AgBiTe_2)_{1-x}In_x$, $(AgBiSe_1)_{1-x}In_x$, $(AgBiTe_2)_{1-x}Ga_x$, $(AgBiSe_2)_{1-x}Ga_x$, $(AgBiTe_1)_{1-x}Al_x$, $(AgBiSe_2)_{1-x}Al_x$, $(CuSbTe_2)_{1-x}In_x$, $(CuSbTe_2)_{1-x}Ga_x$, $(CuSbTe_2)_{1-x}Al_x$, $(CuBiTe_2)_{1-x}In_x$, $(CuBiTe_2)_{1-x}Ga_x$ and $(CuBiTe_2)_{1-x}Al_x$.

8. The optical information recording medium as claimed in claim 1, wherein said recording layer has a thickness ranging from 100 Å to 2000 Å.

9. The optical information recording medium as claimed in claim 1, further comprising a protective layer interposed between said substrate and said recording layer, and a protective layer superposed on said recording layer.

10. The optical information recording medium as claimed in claim 9, wherein said protective layer has a thickness ranging from 300 Å to 3000 Å.

* * * * *